United States Patent [19]
Cheng

[11] 3,919,530
[45] Nov. 11, 1975

[54] COLOR INFORMATION LEUKOCYTES ANALYSIS SYSTEM

[76] Inventor: George Chiwo Cheng, 2220 SW. 34th St. No. 106, Gainesville, Fla. 32608

[22] Filed: Apr. 10, 1974

[21] Appl. No.: 459,781

[52] U.S. Cl............ 235/151.3; 23/230 B; 128/2 G; 235/151.35; 356/184; 356/195
[51] Int. Cl.²... A61B 5/14; G01J 3/48; G01N 21/24; G02F 1/25
[58] Field of Search .......... 23/230 R, 230 B, 253 R; 73/53, 432 R, DIG. 11; 128/2 G; 235/151.35, 151.3; 356/184, 195; 444/1

[56] References Cited
UNITED STATES PATENTS

| | | | |
|---|---|---|---|
| 3,553,444 | 1/1971 | Tong | 235/151.35 |
| 3,560,161 | 2/1971 | Webb | 23/230 R X |
| 3,624,377 | 11/1971 | Zerkin | 235/151.35 X |
| 3,634,868 | 1/1972 | Pelavin | 235/151.3 |
| 3,668,380 | 6/1972 | Claxton | 235/151.35 |
| 3,701,601 | 10/1972 | Plumpe et al. | 235/151.35 X |
| 3,706,499 | 12/1972 | Rapoza et al. | 356/184 |
| 3,706,877 | 12/1972 | Clifford et al. | 235/151.35 |
| 3,742,196 | 6/1973 | Durkos et al. | 235/151.3 |
| 3,751,643 | 8/1973 | Dill et al. | 235/151.3 X |
| 3,818,198 | 6/1974 | Walker | 235/151.3 X |
| 3,828,173 | 8/1974 | Knepler | 235/151.35 |
| 3,832,532 | 8/1974 | Praglin et al. | 235/151.35 X |
| 3,833,796 | 9/1974 | Fetner et al. | 444/1 X |

FOREIGN PATENTS OR APPLICATIONS

| | | | |
|---|---|---|---|
| 156,266 | 1963 | U.S.S.R. | 128/2 G |

OTHER PUBLICATIONS (S 1305–0014) Leopold, H. Digital Processing of Density Measurements. In Electronik 19(12):pp. 411–416. 1970.
(S 2752–0163) Pedersen, E. An Analogue Computing System for Simulation of Absorbtion, Circular Dichrosim and ESR Spectra, In J. Phys. E:Sci. Inst. 5(5): pp. 492–495, May, 1972.
(2714–0020) Wells; D. C. The Computer–Controlled Spectrometers at McDonald Observatory. In Pub. Astron. Soc. Pacific 84(497): pp. 203–206 Feb. 1972.
Andrews; H. L. et al., A Simplified Photoelectric Colorimeter For Blood Analysis In Rev. Sci. Inst. 16(6): pp. 148–152 June 1945.
(s2751–0007) Preston; K. Use of The Cellscan/GLOPR System in the Automatic Identification of White Blood Cells, In Bio–Med. Eng. 7(5):pp.226–231 June 1972.
(S 2729–0028) Agterdenbos, J. et al. Spectrophotometric Determination of 0–50 ng of Chromium in 1 ml of Human Serum, in Talanta 19(3):pp. 341–345, 1972.
(S 1316–0007) Helmerson, U et al. Determination of Lead and Cadmium in Blood by a Modification of the Hessel Method, in Atomic Abs. Newsletter 9(6):pp. 133–134, Nov. 1970.
(S 0183–0123) Hicks, G. P. et al. Application of an On Line Computer to the Automation of Analytical Experiments, in Analyt. Chem. 42(7):pp. 729–137 June 1970.

Primary Examiner—R. Stephen Dildine, Jr.
Attorney, Agent, or Firm—Nicholas J. Aquilino

[57] ABSTRACT

This disclosure relates to a method and apparatus for performing Leukocyte analysis based on the color spectrum of a blood sample. The method includes the steps of converting the color spectrum of a sample to a quantitized function, converting the quantitized function to electronic signals intelligible by a computing device and mathematically manipulating the signals to provide data that may be used to drive a character printer or other output device. The apparatus for performing the analysis includes a microscope, means for recognizing and quantitizing the color spectrum of each type of cells under the microscope, means for generating an electronic signal representing the quantitized color spectrum and computer means to manipulate the electronic signals to provide an intelligible output representing specific parameters of the Leukocytes analyzed.

This system can be constructed to perform routine Leukocytes differential count with modest cost and its operating and maintance are simple and their cost small. Because this system does not need (1) automatical microscope focusing device, (2) image digitization device, (3) programmable digital computer, and (4) computer image analysis software system.

11 Claims, 1 Drawing Figure

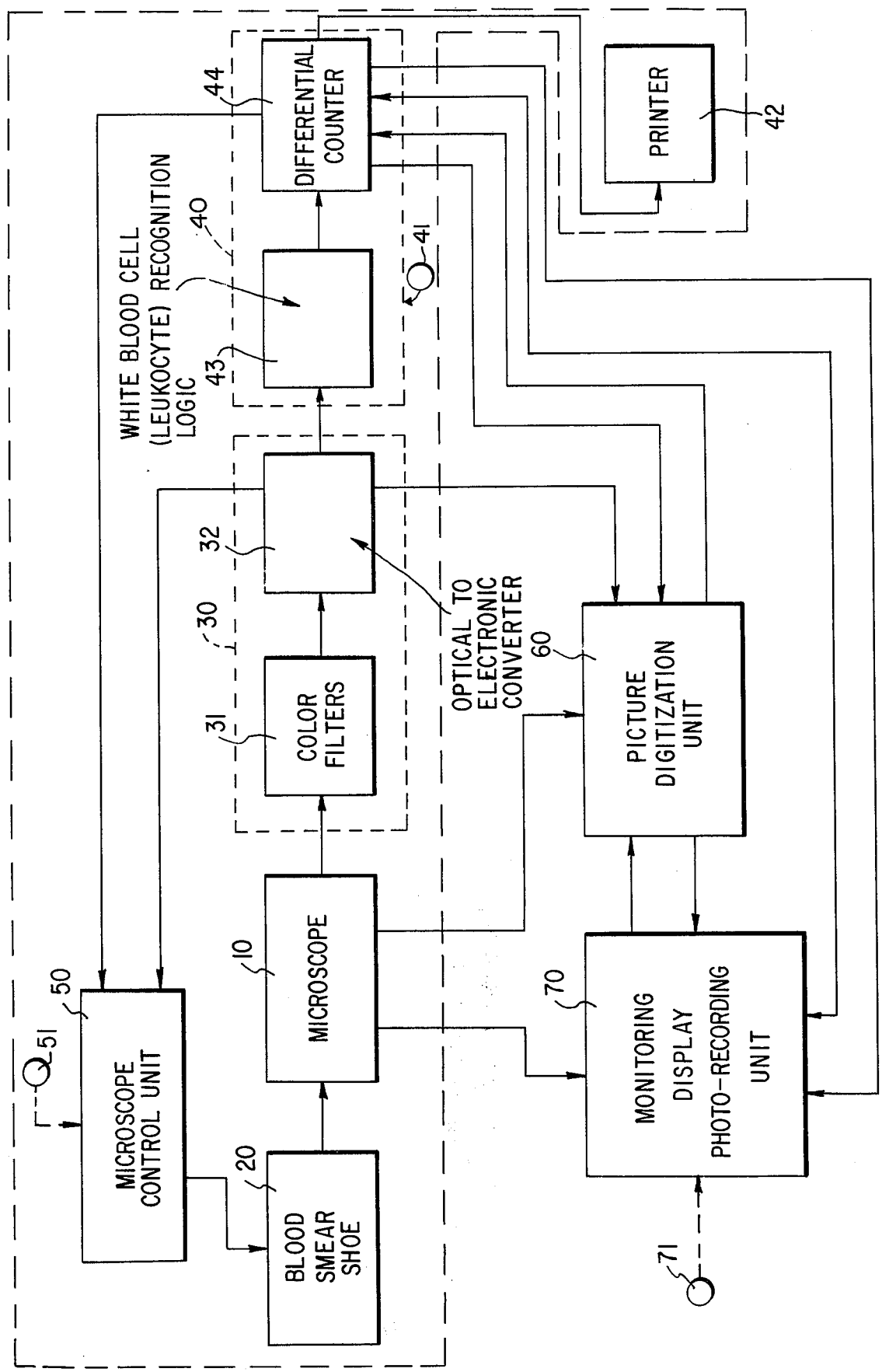

COLOR INFORMATION LEUKOCYTES ANALYSIS SYSTEM

BACKGROUND OF THE INVENTION

The present invention relates to a leukocytes or white blood cell analysis system utilizing color spectrum as the primary recognition means.

There are two known basic automatic blood cell analysis systems, each of which has certain inherent advantages and disadvantages. The older of the two approaches embodies the concept of determining the chemical and physical properties of blood cells by detecting a specific cell in a fluid suspension and determining enzyme cytochemical properties, electrical conductivity, etc. The second and more current approach embodies the concept of a computer analysis of a microscope projected blood smear image based on the morphological characteristics of the blood cells, such as the shape of the nucleus of the cell, the sizes of the nucleus and cytoplasm, etc.

The primary difficulty with the first approach which uses the chemical and physical properties are the poor precision of the measurements and lack of data documentation. The non-morphological criteria of classification of white blood cells are not the standards accepted by the present medical discipline. The usefullness and reliability are difficult to prove because there is no broad data documentation like that of the blood smear on a microscope slide.

The short comings of the computer analysis approach is that of the lack of pictorial pattern recognitions theoretical base and the slow speed due to complicated computer programs. Furthermore, the morphological characteristics of white blood cells are not quantitatively defined, the required cytologic specialists can only acquire their ability from experience, and the differential criteria and analyzing proceedures used by these specialists in their mental processes cannot be adequately directly transformed into computer programs. The monochromatic image and the poor quality of the digitized picture used in the computer analyzing systems are inadequate for leukocyte differentiation according to cytologists standards. Finally, the complete automatic computer system for analyzing white blood cells is not feasible because the discipline of computer analyzing pictorial patterns is still in the embryonic stage and no reliable picture processing method can be adapted for white blood cell analysis at present. The man-machine interactive systems have been used in research with some degree of success, but the speed is too slow to have commercial attraction.

Color information has been utilized extensively by cytologists in cell analysis. However, color information has not been fruitfully utilized in automatic systems. The reason is that inadequate color sources or filters have been used, that is either one color light source such as a laser or the conventional one color filters have been used. In reality, the color of a biological cell is a composition of many colors, i.e. it has a color spectrum covering a relatively wide range. Therefore, one color filtering could not single out the specific blood cell as the designer intended.

OBJECT OF THE INVENTION

Accordingly, an object of the instant invention is too provide an automatic leukocytes analysis system which overcomes the afore stated short comings in the known analysis methods and apparatus.

Another object of the invention is to provide novel and improved apparatus that facilitates biological material analysis at modest expense.

Still another object of the invention is to provide novel and improved apparatus that facilitates analysis of blood and other body fluids.

Another object of the invention is to provide a novel and improved apparatus which eliminates the need for human intervention in clinical analysis, and more particularly, in determining qualitative and quantitative data with respect to the luekocytes in whole blood samples.

SUMMARY OF THE INVENTION

The foregoing and other objects and features of this invention are achieved by analyzing the color spectrum of specific blood cells found in a standard blood smear. This is achieved because the nature of color absorption provides information about what the substance is and the extent of the absorption provides information about the amount of the substance.

In the instant invention, the color image of the blood smear analyzed by the system is projected on a color information analyzer. The analyzer is comprised of a set specially designed color filters and associated electronic components. A computer is used to receive numerical data from the color information analyzer and make leukocyte differential counts and other statistical computations for the printing of a report after the blood smear has been analyzed.

DESCRIPTION OF THE DRAWINGS

The FIGURE is a block diagram illustrating a preferred embodiment of the present invention.

A preferred embodiment of the instant invention, illustrated in the figure, includes a microscope 10 adapted to receive a blood smear sample placed on a blood smear slide 20. Light is directed through the blood smear and guided to a color information analyzer 30. The color analyzer 30 converts the optical color spectrum data from the microscope into electronic signals which are applied to the computer 40. The computer 40 analyzes the signals and provides an appropriate print out via printer 42 with respect to the automated analysis of the blood smear.

The computer 40 is interconnected to the microscope control unit 50 and provides a signal thereto which causes the microscope to scan the complete blood smear. While the smear is being scanned, the computer determines to what class the region on the blood smear under examination belongs. Differential counters within the computer keep records of the determined classes except those classes which are the background and red blood cells. After all the useful area on the blood smear has been scanned, a printout is provided by the output portion of the computer.

The microscope control unit 50 is responsive to an output from the color information analyzer 30 in addition to the scanning drive output from the computer 40. The output from the color information analyzer 30 may be utilized to cause the microscope 10 to be automatically focused during the scanning operation.

A picture digitization and/or photographic recording devices can be incorporated in the system and adapted to function in combination with the automated microscope and computer. These accessories provide a means for the blood smear image to be digitized for computer analysis and/or displayed for a human operator to study. The smear image can also be photographically recorded for various purposes.

Through the use of manual controls 41, 51, and 71, a human operator can control the computer, microscope, monitoring unit, and picture digitization unit either directly or indirectly.

The optical-to-electronic converter 32, the differential counter 44 or computer and the printer 42 are standard devices. The analogue and/or digital electronic circuits needed to perform the recognition or classification logic may be in the form of a special purpose computer 43 or may be a simple soft ware routine for a general purpose computer. The color filter 31 of the color information analyzer 30 incorporate a match filter technique in one embodiment and a band pass filter technique in an alternate embodiment.

In the match filter technique, color match filters are utilized. Light passing through the optical filters is viewed as the cross-correlation coefficient of the source light as expressed as a color spectrum function of the optic filter transmission color spectrum. The cross-correlation coefficient represents the degree of similarity between the reference class and the unknown region under microscope. For instance:

Let $\{f_i(\lambda)\}$ be the color spectrum functions of the color match-filters that are designed to represent the classes or regions in the blood smear. This color spectrum function is normalized so that $$\int_{400}^{700} |f_i(\lambda)|^2 d\lambda = 1$$

where is the wavelength in nanometers.

Let $g()$ to the color spectrum function from an unknown region in the blood smear, and this function is also normalized so that $$\int_{400}^{700} |g(\lambda)|^2 d\lambda = 1$$

Then the light that passes the ith filter is $$A_i = \int_{400}^{700} g(\lambda) f_i(\lambda) d\lambda$$

Let $$A_K = \max_{\text{all } i} \{A_i\}$$

Let $\{\theta_j\}$ be a finite set thresholds, and $0 < \theta_j < 1$, $\theta_j < \theta_j + 1$.

If $\theta_j \leq A_K < \theta_{j+1}$ then the unknown region under examination is said to belong to the K-th class with the confidence level above or equal $_j$.

The color spectrum, $f_i(\lambda)$, of the color match-filter requires a large data base to determine or to derive a reference (and some sub-references) for a class of regions in the blood smear. The actual meaning of the confidence levels, $\{\theta_j\}$, has also to be established statistically from a sufficiently large data base.

In the band-pass filter technique, the color spectrum bands that do not contribute useful information can be ignored, therefore, the effect of noise in these bands can be eliminated.

In this method, the filter spectrum functions are the selected primary features but do not directly correspond to the classes of regions as in the match-filter case. The outputs of these band-pass filters are analog signals, and are operated on by some numerical and non-numerical (logic) functions, and artificial intelligence techniques can be applied.

The determination of the number of filters, the center wavelength of each filter, and the bandwidth of each filter are based on a statistical study of a sufficiently large amount data.

In performing a leukocytes analysis of a blood sample with the apparatus described herein, a standard sample smear slide of the type adapted to be used in the automatic scanning microscope of the system is prepared and placed in the microscope. The microscope scans a predetermined area thereof in response to the microscope control unit which interprets the actions of the controlling operator or the signals of the computer in a completely automated mode of operation. The color spectrum optical data provided by the microscope is processed by the color filters which converts the optical signal into specific electrical data representing the color spectrum of the sample smear. The electronic data is analyzed to distinguish leukocytes and the resultant data is tabulated by electronic means which provide driving signals for visual displays and printout devices.

While I have described the preferred embodiments of my invention in some detail, it should be understood that the invention is not limited to the particular details herein described, but may be carried out in other ways as falling within the scope of the appended claims.

Accordingly, what I claim as my invention and desire to protect by letters patent is:

1. An apparatus for performing leukocyte analysis, comprising:
    a microscope for providing an output representing a specimen under test;
    a color spectrum analyzer responsive to said output of said microscope for producing electronic signals representing a function of the color spectrum of said microscope output, said color spectrum analyzer comprising, a plurality of color spectrum filters based on empirically determined Leukocyte related color spectrum characteristics and an optical to electronic converter responsive to said color filters;
    a computer responsive to said color spectrum analyzer for producing electronic data representative of predetermined color spectrum characteristics of said specimen; and
    means responsive to said computer for providing an intelligible record of said electronic data produced by said computer.

2. An apparatus as defined in claim 1 wherein a said microscope control means is adapted to be responsive to manual operation, said color spectrum analyzer and said computer.

3. An apparatus as defined in claim 2 wherein said computer includes:
    means for recognizing signals from said color spectrum analyzer as functions of Leukocyte in said specimen under test; and means for accumulating said recognized signals.

4. An apparatus as defined in claim 3 wherein said means responsive to said computer for providing an intelligible record is a character printer.

5. An apparatus as defined in claim 4, further comprising; optical means for displaying said microscope output.

6. An apparatus as defined in claim 5, further comprising; means for digitizing said microscope output.

7. An apparatus as defined in claim 6 wherein said means for digitizing said microscope output is responsive to said computer and said color spectrum analyzer.

8. An apparatus as defined in claim 7 wherein said optical means is adapted for displaying said digitized microscope output.

9. An apparatus as defined in claim 1 wherein said color filters are match filters adapted to provide a quantitized color spectrum function.

10. An apparatus as defined in claim 1 wherein said color filters are band pass filters adapted to pass a quantitized color spectrum function of selected spectrum bands.

11. A method of performing Leukocyte analysis comprising the steps of:
preparing a blood sample smear slide;
placing said slide in a microscope;
scanning a predetermined area of said slide with said microscope;
selectively filtering the output of said microscope to produce a quantitized representation of the color spectrum of said scanned sample;
converting said quantitized representation to electronic data; and
mathematically manipulating said converted data to provide an intelligible output representative of the properties of the Leukocyte examined.

* * * * *